(12) United States Patent
Takagishi et al.

(10) Patent No.: US 9,697,853 B2
(45) Date of Patent: Jul. 4, 2017

(54) MAGNETIC RECORDING HEAD AND MAGNETIC RECORDING AND REPRODUCING DEVICE

(71) Applicant: Kabushiki Kaisha Toshiba, Tokyo (JP)

(72) Inventors: Masayuki Takagishi, Tokyo (JP); Kenichiro Yamada, Tokyo (JP); Tomoyuki Maeda, Kanagawa (JP); Katsuya Sugawara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/265,041

(22) Filed: Sep. 14, 2016

(65) Prior Publication Data

US 2017/0004850 A1 Jan. 5, 2017

Related U.S. Application Data

(62) Division of application No. 14/811,149, filed on Jul. 28, 2015, now abandoned.

(30) Foreign Application Priority Data

Jul. 30, 2014 (JP) .................................. 2014-155285

(51) Int. Cl.
*G11B 5/11* (2006.01)
*G11B 5/31* (2006.01)
*G11B 5/127* (2006.01)

(52) U.S. Cl.
CPC .............. *G11B 5/3146* (2013.01); *G11B 5/11* (2013.01); *G11B 5/1278* (2013.01)

(58) Field of Classification Search
None
See application file for complete search history.

(56) References Cited

U.S. PATENT DOCUMENTS

| 6,329,211 | B1 | 12/2001 | Terunuma et al. | |
|---|---|---|---|---|
| 6,950,277 | B1 | 9/2005 | Nguy et al. | |
| 7,576,951 | B2* | 8/2009 | Allen | G11B 5/11 360/125.13 |
| 7,821,736 | B2* | 10/2010 | Che | G11B 5/11 360/125.04 |
| 7,869,160 | B1 | 1/2011 | Pan et al. | |
| 8,079,135 | B1 | 12/2011 | Shen et al. | |
| 8,189,294 | B2* | 5/2012 | Edelman | G11B 5/1278 360/125.3 |
| 8,542,463 | B2 | 9/2013 | Guan | |

(Continued)

FOREIGN PATENT DOCUMENTS

| JP | 2004-342164 | 12/2004 |
|---|---|---|
| JP | 2005-293693 | 10/2005 |

(Continued)

*Primary Examiner* — Will J Klimowicz
(74) *Attorney, Agent, or Firm* — Finnegan, Henderson, Farabow, Garrett & Dunner, L.L.P.

(57) ABSTRACT

According to one embodiment, a magnetic recording head includes a magnetic pole and a shield. The shield has a first opposing surface opposing the magnetic pole. The first opposing surface includes a first opposing portion. The magnetic pole and the first opposing portion overlap in a first direction from the magnetic pole toward the shield. The first opposing portion includes a first protrusion.

12 Claims, 9 Drawing Sheets

(56) References Cited

U.S. PATENT DOCUMENTS

| | | |
|---|---|---|
| 8,630,064 B2 | 1/2014 | Maeda et al. |
| 9,001,467 B1 | 4/2015 | Zeng et al. |
| 9,082,425 B2 | 7/2015 | Lopusnik et al. |
| 9,349,389 B2 * | 5/2016 | Takagishi .................. G11B 5/11 |
| 2004/0228030 A1 | 11/2004 | Mochizuki et al. |
| 2005/0219764 A1 | 10/2005 | Kameda et al. |
| 2007/0115584 A1 | 5/2007 | Balamane et al. |
| 2007/0211384 A1 | 9/2007 | Hsiao et al. |
| 2007/0236831 A1 | 10/2007 | Che et al. |
| 2007/0245545 A1 | 10/2007 | Pentek et al. |
| 2007/0258167 A1 | 11/2007 | Allen et al. |
| 2007/0268625 A1 | 11/2007 | Jiang et al. |
| 2011/0147222 A1 | 6/2011 | Pentek et al. |
| 2011/0310511 A1 | 12/2011 | Edelman et al. |
| 2012/0314324 A1 | 12/2012 | Guan |
| 2013/0120876 A1 | 5/2013 | Maeda et al. |

FOREIGN PATENT DOCUMENTS

| | | |
|---|---|---|
| JP | 2009-048719 | 3/2009 |
| JP | 2013-004164 | 1/2013 |
| WO | WO 2006100774 | 9/2006 |

* cited by examiner

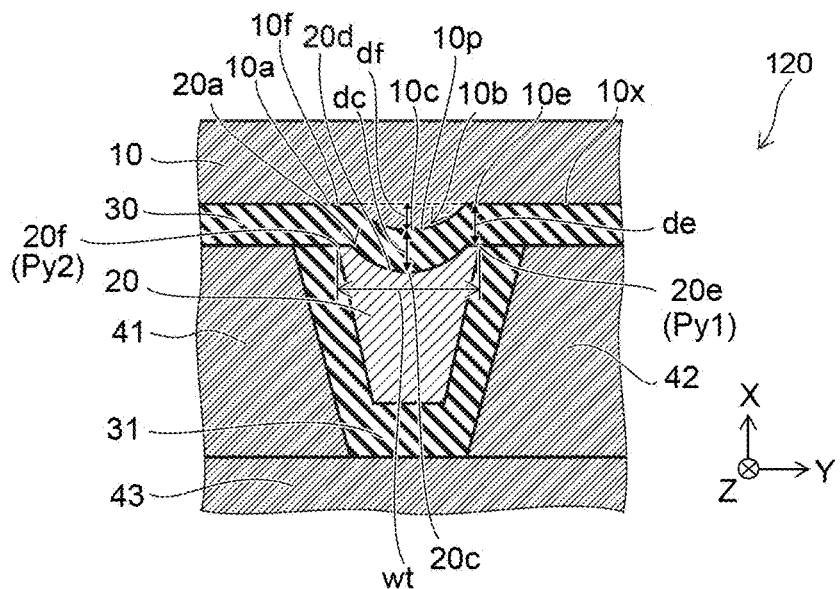
FIG. 7
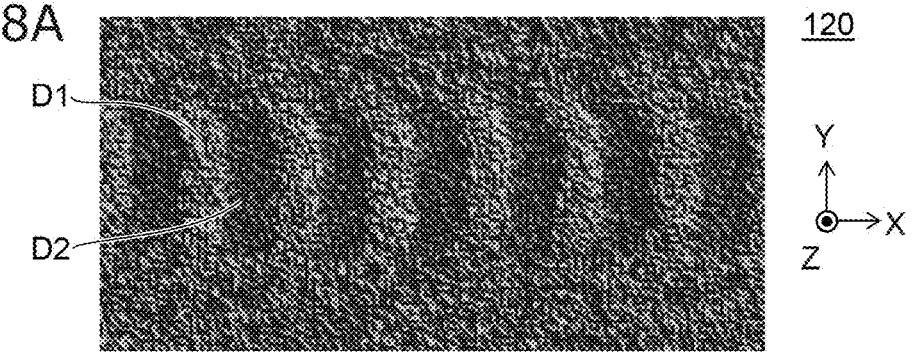
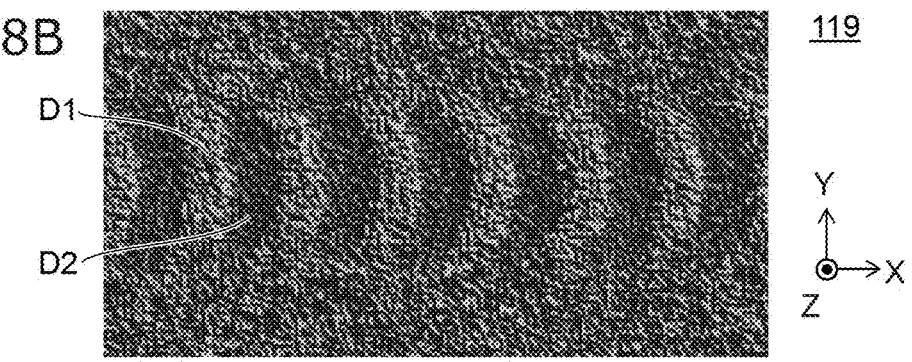

US 9,697,853 B2

MAGNETIC RECORDING HEAD AND MAGNETIC RECORDING AND REPRODUCING DEVICE

CROSS-REFERENCE TO RELATED APPLICATIONS

This application is a divisional of application Ser. No. 14/811,149, filed Jul. 28, 2015, which is based upon and claims the benefit of priority from prior Japanese Patent Application No. 2014-155285, filed on Jul. 30, 2014. The entire contents of these prior applications are incorporated herein by reference.

FIELD

Embodiments described herein relate generally to a magnetic recording head and a magnetic recording and reproducing device.

BACKGROUND

Information is recorded in a magnetic storage medium such as a HDD (Hard Disk Drive), etc., using a magnetic recording head. For example, perpendicular magnetic recording is advantageous for high-density recording. It is desirable to increase the recording density for the magnetic recording head and a magnetic recording and reproducing device.

BRIEF DESCRIPTION OF THE DRAWINGS

FIG. 7 is a schematic plan view showing a magnetic recording head according to a second embodiment;
FIG. 8A and FIG. 8B are schematic plan views showing characteristics of the magnetic recording heads.
FIG. 8A is a schematic plan view showing characteristics of the magnetic recording head 120 according to the second embodiment.

DETAILED DESCRIPTION

Figure 1:
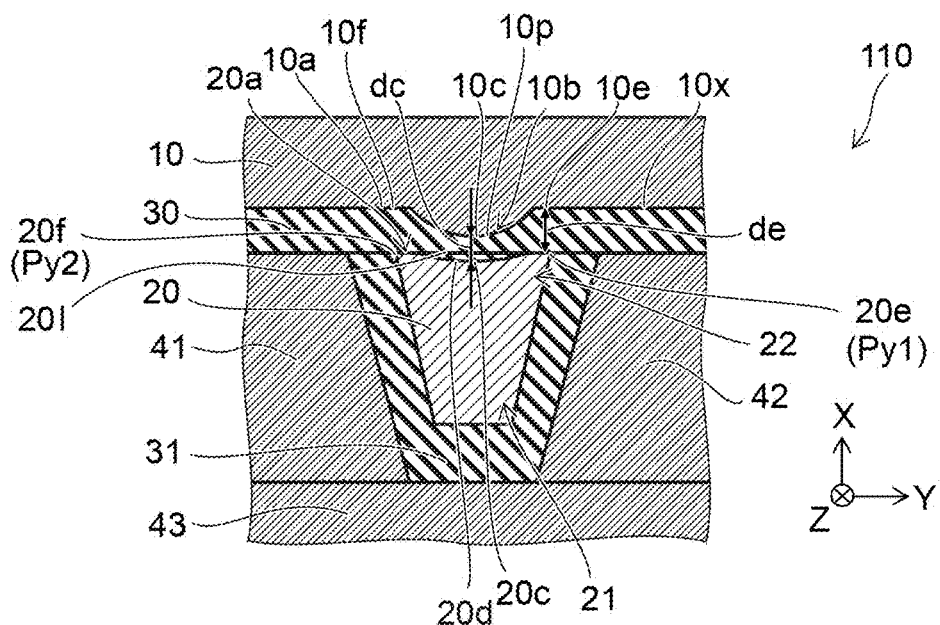
FIG. 1 is a schematic plan view showing a magnetic recording head according to a first embodiment.

According to one embodiment, a magnetic recording head includes a magnetic pole and a shield. The shield has a first opposing surface opposing the magnetic pole. The first opposing surface includes a first opposing portion. The magnetic pole and the first opposing portion overlap in a first direction from the magnetic pole toward the shield. The first opposing portion includes a first protrusion.

According to one embodiment, a magnetic recording and reproducing device includes the magnetic recording head described above, and a magnetic recording medium having perpendicular magnetic recording. Information is recorded in the magnetic recording medium by the magnetic pole.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

FIG. 1 is a schematic plan view illustrating a magnetic recording head according to a first embodiment.

FIG. 1 is a plan view of the magnetic recording head 110 as viewed from a medium-opposing surface described below.

As shown in FIG. 1, the magnetic recording head 110 according to the embodiment includes a magnetic pole 20 and a shield 10. The magnetic pole 20 writes information to a magnetic recording medium. The shield 10 is a trailing shield.

The shield 10 has a first opposing surface 10a. The first opposing surface 10a opposes the magnetic pole 20. The magnetic pole 20 has a second opposing surface 20a.

The second opposing surface 20a opposes the shield 10. In other words, the first opposing surface 10a and the second opposing surface 20a oppose each other.

In the example, a first protrusion 10p is provided in the first opposing surface 10a. The second opposing surface 20a of the magnetic pole 20 is a curved surface. In the example, the second opposing surface 20a of the magnetic pole 20 is a concave surface.

A gap insulating unit 30 is provided between the magnetic pole 20 and the shield 10. A first side shield 41 and a second side shield 42 are further provided in the example. The magnetic pole 20 is disposed between the first side shield 41 and the second side shield 42. A shield 43 is further provided in the example. The first side shield 41, the second side shield 42, and the magnetic pole 20 are disposed between the shield 10 and the shield 43. An insulating unit 31 is provided between the shield 43 and the magnetic pole 20. The gap insulating unit 30 and the insulating unit 31 include, for example, materials including oxides of aluminum.

A first direction from the magnetic pole 20 toward the shield 10 is an X-axis direction. For example, the X-axis direction corresponds to the down-track direction in the case where the skew angle is zero. One direction perpendicular to the X-axis direction is taken as a Y-axis direction. The Y-axis direction is the track width direction. A direction perpendicular to the X-axis direction and the Y-axis direction is taken as a Z-axis direction. The Z-axis direction is the height direction. The skew angle is the angle between the down-track direction and the direction from the magnetic pole 20 toward the shield 10.

For example, in the case where the first side shield 41 and the second side shield 42 are provided in the magnetic recording head 110, the direction connecting the first side shield 41 and the second side shield 42 corresponds to the track width direction.

Figure 2:
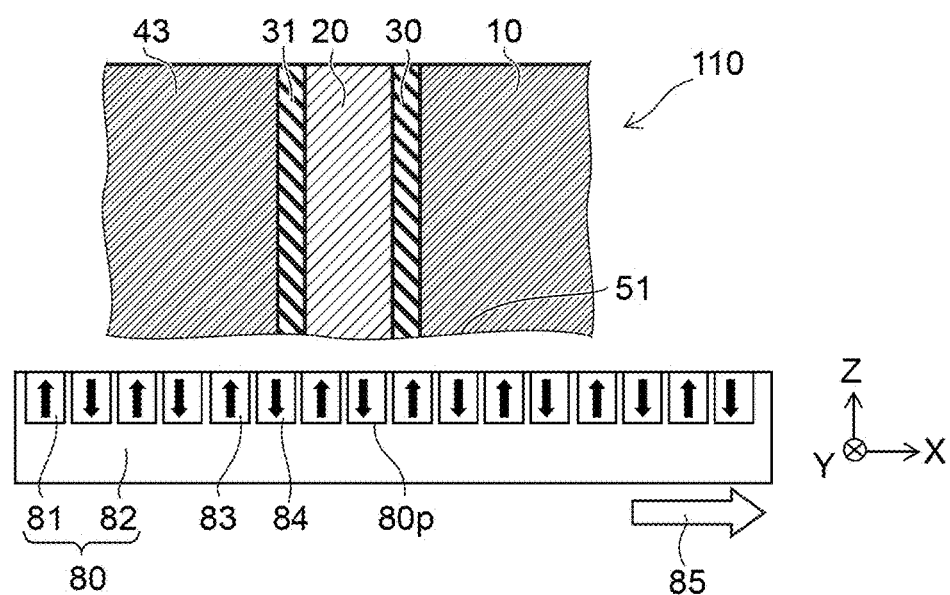
FIG. 2 is a schematic cross-sectional view showing the magnetic recording head according to the first embodiment.

FIG. 2 is a schematic cross-sectional view illustrating the magnetic recording head according to the first embodiment.

The magnetic recording head 110 is disposed to oppose a magnetic recording medium 80 (e.g., a magnetic disk, etc.). The magnetic recording head 110 has a medium-opposing surface 51 (an Air Bearing Surface (ABS)).

The track width direction (the Y-axis direction) is parallel to the medium-opposing surface 51 provided in the magnetic recording head 110 and perpendicular to the first direction from the magnetic pole 20 toward the shield 10. The magnetic recording medium 80 includes, for example, a medium substrate 82, and a magnetic recording layer 81 provided on the medium substrate 82. Multiple recorded bits 84 are provided in the magnetic recording layer 81. The magnetic recording medium 80 moves relative to the magnetic recording head 110 along a medium movement direction 85. For example, the medium movement direction 85 corresponds to the direction (the first direction) from the magnetic pole 20 toward the shield 10.

A designated portion 80p of the magnetic recording medium 80 opposes the shield 10 after opposing the magnetic pole 20.

A magnetization 83 of each of the multiple recorded bits 84 is controlled by a magnetic field applied from the magnetic recording head 110. Thereby, the writing operation is implemented.

A reproducing unit (not shown) that senses the direction of the magnetization 83 may be further provided in the magnetic recording head 110.

Figure 3:
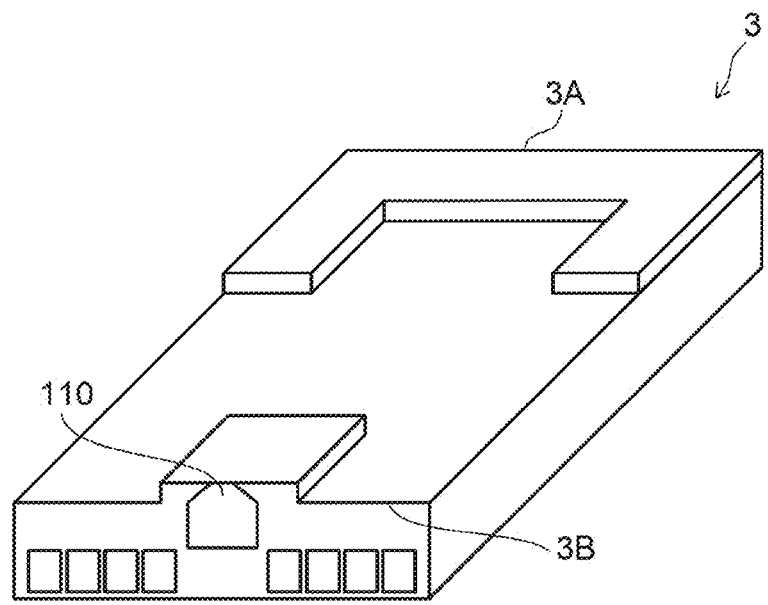
FIG. 3 is a schematic perspective view showing a head slider to which the magnetic recording head according to the first embodiment is mounted.

FIG. 3 is a schematic perspective view illustrating a head slider to which the magnetic recording head according to the first embodiment is mounted.

The magnetic recording head 110 is mounted to the head slider 3. The head slider 3 includes, for example, $Al_2O_3$/TiC, etc. The head slider 3 moves relative to the magnetic recording medium 80 while flying over or contacting the magnetic recording medium 80.

The head slider 3 has, for example, an air inflow side 3A and an air outflow side 3B. The magnetic recording head 110 is disposed at the side surface of the air outflow side 3B of the head slider 3 or the like. Thereby, the magnetic recording head 110 that is mounted to the head slider 3 moves relative to the magnetic recording medium 80 while flying over or contacting the magnetic recording medium 80.

In the example as shown in FIG. 1, the configuration of the magnetic pole 20 at the medium-opposing surface 51 is a substantially trapezoidal configuration. In other words, the magnetic pole 20 includes a first portion 21 and a second portion 22. The second portion 22 is provided between the first portion 21 and the shield 10. The width of the second portion 22 in the track width direction (the Y-axis direction) is wider than the width of the first portion 21 in the track width direction. Thereby, for example, the characteristics in the track width direction are good in the case where the skew angle is nonzero.

In the embodiment as shown in FIG. 1, the first protrusion 10p is provided in the first opposing surface 10a. In the example, the first protrusion 10p has a curved configuration.

Specifically, the first opposing surface 10a includes a first opposing portion 10b. The first opposing portion 10b and the magnetic pole 20 overlap in the first direction (the X-axis direction). In other words, the first opposing portion 10b and the magnetic pole 20 overlap when projected onto the Y-Z plane. The Y-Z plane intersects the first direction (the X-axis direction) from the magnetic pole 20 toward the shield 10. In the example, the Y-Z plane is perpendicular to the first direction (the X-axis direction).

The first opposing surface 10a also includes a portion other than the first opposing portion 10b. For example, the portion other than the first opposing portion 10b is a plane. In other words, the first opposing surface 10a further includes a non-opposing portion 10x. The non-opposing portion 10x and the magnetic pole 20 do not overlap in the first direction (the X-axis direction). In other words, the non-opposing portion 10x and the magnetic pole 20 do not overlap when projected onto the Y-Z plane. In the example, the non-opposing portion 10x is a plane. For example, the unevenness of the non-opposing portion 10x is smaller than the unevenness of the first opposing portion 10b. In other words, the size (the height) of the first protrusion 10p provided in the first opposing portion 10b is larger (higher) than the size (the height) of the unevenness of the non-opposing portion 10x.

Thereby, the distance between the magnetic pole 20 and the shield 10 changes in the track width direction (the Y-axis direction)

In other words, the second opposing surface 20a includes a first magnetic pole end portion 20e, a second magnetic pole end portion 20f, and a magnetic pole central portion 20c. The first magnetic pole end portion 20e is one end portion of the magnetic pole 20 in the track width direction of the magnetic pole 20. The second magnetic pole end portion 20f is the other end portion of the magnetic pole 20 in the track width direction. The magnetic pole central portion 20c is the central portion of the magnetic pole 20 in the track width direction. The magnetic pole central portion 20c is separated from the ends (the first magnetic pole end portion 20e and the second magnetic pole end portion 20f) of the magnetic pole 20 in the track width direction. A position Py1 is the position of the first magnetic pole end portion 20e in the track width direction (the Y-axis direction). A position Py2 is the position of the second magnetic pole end portion 20f in the track width direction (the Y-axis direction).

On the other hand, the first opposing portion 10b includes shield end portions (a first shield end portion 10e and a second shield end portion 10f) and a shield central portion 10c. The first shield end portion 10e and the first magnetic pole end portion 20e overlap in the first direction (the X-axis direction). In other words, the first shield end portion 10e and the first magnetic pole end portion 20e overlap when projected onto the plane (the Y-Z plane) recited above. The second shield end portion 10f and the second magnetic pole end portion 20f overlap in the first direction (the X-axis direction). In other words, the second shield end portion 10f and the second magnetic pole end portion 20f overlap when projected onto the plane (the Y-Z plane) recited above. The position of the first shield end portion 10e is positioned at the position of the first magnetic pole end portion 20e when projected onto the Y-Z plane. The position of the second shield end portion 10f is positioned at the position of the second magnetic pole end portion 20f when projected onto the Y-Z plane. The shield central portion 10c is positioned between the first shield end portion 10e and the second shield end portion 10f in the track width direction. The shield central portion 10c and the magnetic pole central portion 20c overlap in the first direction (the X-axis direction). In other words, the shield central portion 10c and the magnetic pole central portion 20c overlap when projected onto the plane recited above. The position of the shield central portion 10c is positioned at the position of the magnetic pole central portion 20c when projected onto the Y-Z plane.

An end portion distance de is the distance between the first magnetic pole end portion 20e and the first shield end portion 10e. A central portion distance dc is the distance between the magnetic pole central portion 20c and the shield central portion 10c.

In the embodiment, the first protrusion 10p is provided in the first opposing portion 10b. Therefore, the central portion distance dc is shorter than the end portion distance de. Thereby, the magnetic field can be concentrated at the track central portion; and the bit length inside the track can be short. In other words, the BPI (bits per inch) can be increased.

In the embodiment, it is favorable for the end portion distance de to be not less than 1.1 times the central portion distance dc. Thereby, the magnetic field concentrates in the track central portion; and the signal-to-noise ratio improves. It is favorable for the central portion distance dc to be not more than 1.5 times the end portion distance de. Thereby, the phenomenon of the magnetic pole becoming saturated when the magnetic field is too concentrated at the center is suppressed; and the decrease of the signal-to-noise ratio can be suppressed.

In the embodiment, a linear line 20l connects the first magnetic pole end portion 20e and the second magnetic pole end portion 20f. Then, a third distance between a linear line 20l and the shield central portion 10c in the first direction (X-axis direction) is shorter than a first distance between the linear line 20l and the first shield end portion 10e in the first direction and shorter than a second distance between the linear line 20l and the second shield end portion 10f in the first direction.

Figure 4:
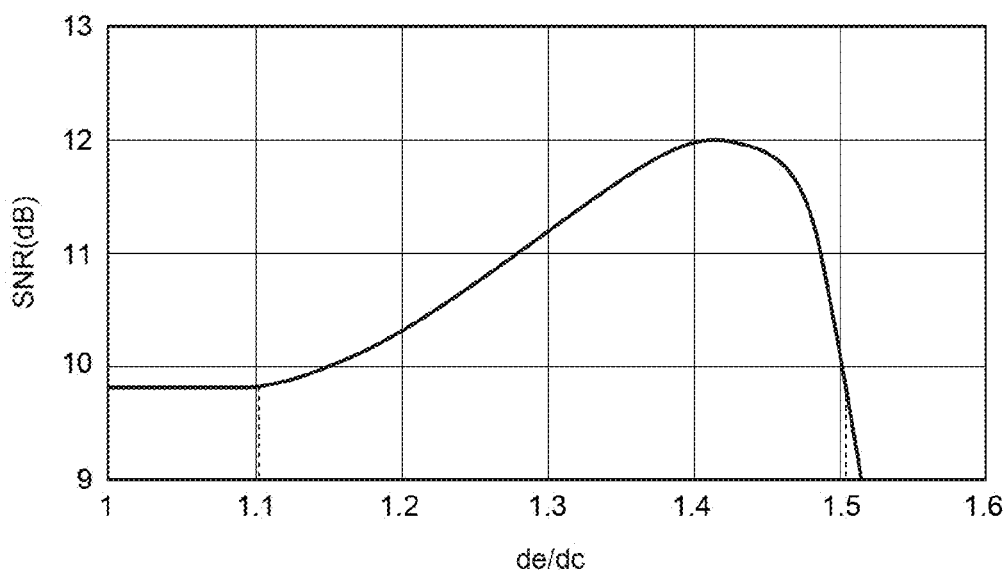
FIG. 4 is a graph of a characteristic of the magnetic recording head according to the first embodiment.

FIG. 4 is a graph of a characteristic of the magnetic recording head according to the first embodiment.

FIG. 4 illustrates simulation results of the signal-to-noise ratio when the central portion distance dc and the end portion distance de are changed for the magnetic recording head 110. In the example, the bit length is 50 nanometers; and the average gap length is 22 nanometers. The bit length is the maximum width of the magnetic pole 20 in the Y-axis direction. The average gap length is the average of the central portion distance dc and the end portion distance de (i.e., (dc+de)/2). In the simulation, the ratio de/dc of the end portion distance de to the central portion distance dc is changed while (dc+de)/2 is constant. In FIG. 4, the horizontal axis is de/dc; and the vertical axis is a signal-to-noise ratio SNR (dB).

As shown in FIG. 4, the signal-to-noise ratio SNR increases when de/dc is not less than 1.1. The signal-to-noise ratio SNR increases as de/dc increases when de/dc is not less than 1.1 and not more than 1.4. When de/dc exceeds 1.4, the signal-to-noise ratio SNR has a downward trend as de/dc increases. The signal-to-noise ratio SNR is low when de/dc exceeds 1.5.

For example, it is favorable for de/dc to be not less than 1.1 and not more than 1.5. de/dc may be not less than 1.15 and not more than 1.49. A higher signal-to-noise ratio SNR is obtained. It is more favorable for de/dc to be not less than 1.27 and not more than 1.48. At this time, the signal-to-noise ratio SNR is about 11 dB or more. It is more favorable for de/dc to be not less than 1.35 and not more than 1.45. At this time, the signal-to-noise ratio SNR is about 11 dB or more.

In the example, the maximum BPI improvement ratio is about 12%. In the embodiment, the concentration of the magnetic field and the saturation of the magnetic pole are determined by de/dc.

Figure 5:
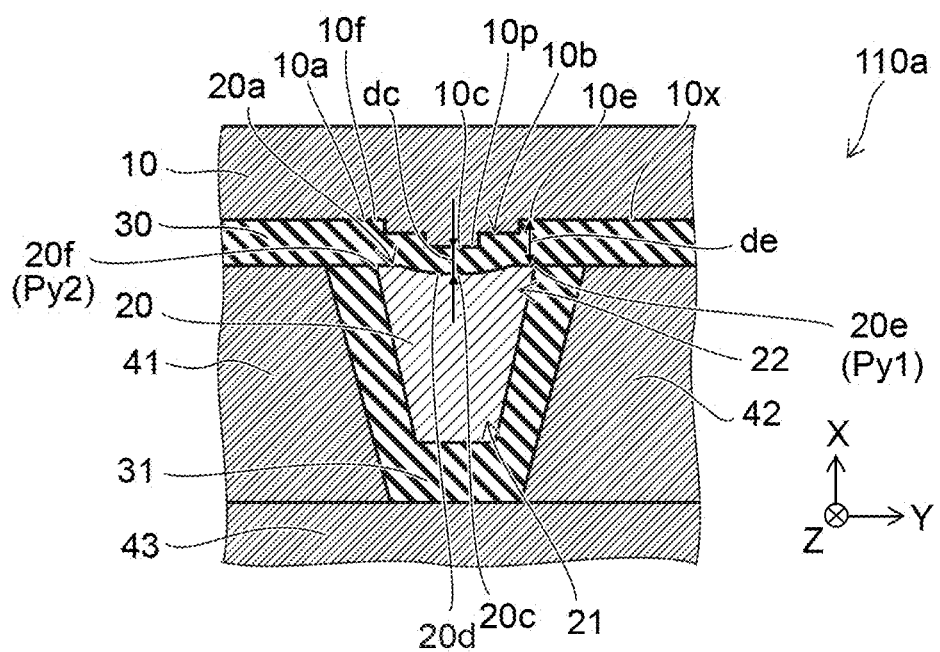
FIG. 5 is a schematic plan view showing another magnetic recording head according to the first embodiment.

FIG. 5 is a schematic plan view illustrating another magnetic recording head according to the first embodiment.

In the magnetic recording head 110a according to the embodiment, the first protrusion 10p has a step configuration. In such a case as well, the central portion distance dc is shorter than the end portion distance de. Thereby, the magnetic field can be concentrated at the track central portion; and the bit length inside the track can be short. In other words, the BPI can be increased. Thus, the first protrusion 10p may have a curved configuration or a step configuration. The number of steps of the step configuration is arbitrary.

Figure 6A:
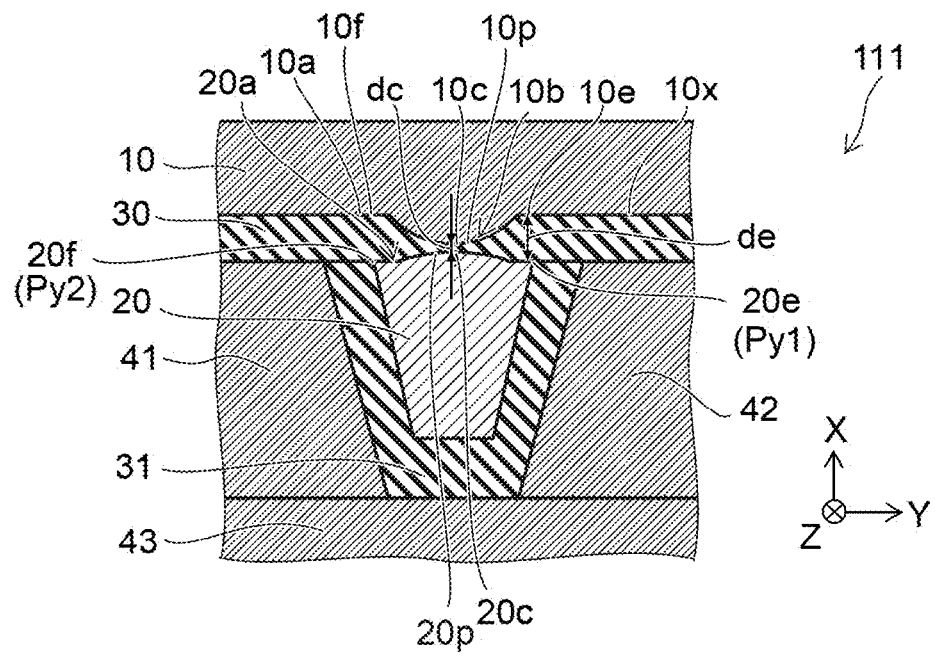
FIG. 6A and FIG. 6B are schematic plan views showing other magnetic recording heads according to the first embodiment.
Figure 6B:
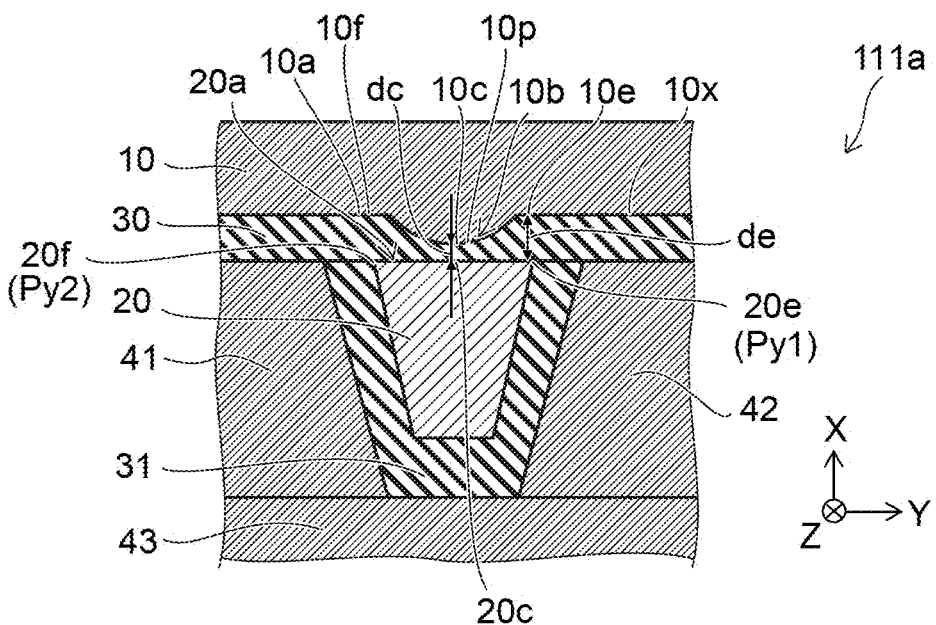

FIG. 6A and FIG. 6B are schematic plan views illustrating other magnetic recording heads according to the first embodiment.

As shown in FIG. 6A, in a magnetic recording head 111 according to the embodiment, the first protrusion 10p is provided in the first opposing portion 10b. The second opposing surface 20a of the magnetic pole 20 includes a second protrusion 20p. The central portion distance dc is shorter than the end portion distance de. Thereby, the magnetic field can be concentrated at the track central portion; and the bit length inside the track can be short. In other words, the BPI can be increased. In the example, the second protrusion 20p has a curved configuration. The second protrusion 20p may have a step configuration.

As shown in FIG. 6B, in a magnetic recording head 111a according to the embodiment, the first protrusion 10p is provided in the first opposing portion 10b. The second opposing surface 20a of the magnetic pole 20 is a plane. In the magnetic recording head 111a as well, the central portion distance dc is shorter than the end portion distance de. Thereby, the magnetic field can be concentrated at the track central portion; and the bit length inside the track can be short. In the example, the second protrusion 20p has a curved configuration. The second protrusion 20p may have a step configuration.

Second Embodiment

FIG. 7 is a schematic plan view illustrating a magnetic recording head according to a second embodiment.

As shown in FIG. 7, the shield 10 and the magnetic pole 20 are provided in the magnetic recording head 120 according to the embodiment as well. The first opposing portion 10b includes the first protrusion 10p. The second opposing surface 20a has a recess 20d.

In the example, the configuration of the recess 20d of the second opposing surface 20a is made along the configuration of the first protrusion 10p of the first opposing portion 10b. For example, the end portion distance de between the first magnetic pole end portion 20e and the first shield end portion 10e is substantially the same as the central portion distance dc between the magnetic pole central portion 20c and the shield central portion 10c. For example, the difference between the end portion distance de and the central portion distance dc is not more than 0.1 times the width of the magnetic pole 20 (a width wt of the second opposing surface 20a in the track width direction).

It is described in the first embodiment that the BPI can be increased by modifying the difference between the end portion distance de and the central portion distance dc in the track width direction. On the other hand, in the embodiment, the difference between the end portion distance de and the central portion distance dc is substantially constant. In such a case as well, the configuration of the bit pattern formed in the magnetic recording medium 80 is controlled by providing the first protrusion 10p in the first opposing portion 10b; and as a result, the BPI can be increased.

In the magnetic recording head 120, the protrusion amount of the first protrusion 10p of the shield 10 is set to be a height df. The height df is the distance (the maximum value of the distance) in the X-axis direction between the position in the X-axis direction of the non-opposing portion 10x of the shield 10 and the position in the X-axis direction of the first protrusion 10p of the shield 10. As described below, it is favorable for the height df to be less than the width of the magnetic pole 20 (the width wt of the second opposing surface 20a in the track width direction).

FIG. 8A and FIG. 8B are schematic plan views illustrating characteristics of the magnetic recording heads. FIG. 8A is a schematic plan view illustrating characteristics of the magnetic recording head 120 according to the second embodiment.

FIG. 8B is a schematic plan view illustrating characteristics of a magnetic recording head 119 of a reference example.

In the magnetic recording head 119, the first opposing surface 10a of the shield 10 is a plane; and the first protrusion is not provided. The second opposing surface 20a of the magnetic pole 20 also is a plane; and a recess is not provided in the second opposing surface 20a. In other words, in the magnetic recording head 119, the distance between the magnetic pole 20 and the shield 10 is constant.

Figures 9A, 9B:
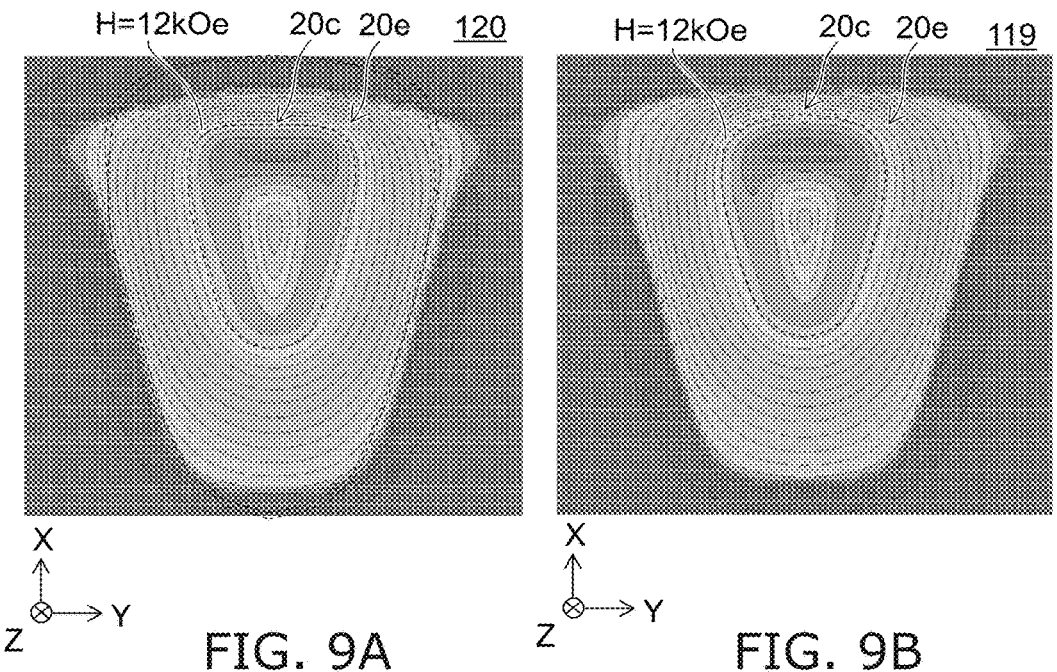
FIG. 9A and FIG. 9B are schematic views showing characteristics of the magnetic recording heads.

FIG. 8A and FIG. 8B illustrate the bit pattern of the magnetization 83 of the magnetic recording medium 80 to which the information is written by the magnetic recording heads. In the figures, bright portions D1 and dark portions D2 that are observed correspond to, for example, the vertical direction of the magnetization 83. FIG. 9A and FIG. 9B correspond to the magnetic recording head 120 and the magnetic recording head 119, respectively. As described above, the first opposing surface 10a of the shield 10 and the second opposing surface 20a of the magnetic pole 20 are planes in the magnetic recording head 119.

In the magnetic recording head 119 as shown in FIG. 8B, the shapes of the bright portions D1 and the dark portions D2 are greatly curved. In other words, for the entire track width direction (the Y-axis direction), the outlines of the bright portions D1 and the dark portions D2 are greatly curved.

Conversely, in the magnetic recording head 120 according to the embodiment, the curves of the bright portions D1 and the dark portions D2 are reduced. For example, the outlines of the bright portions D1 and the dark portions D2 at the central portion in the track width direction (the Y-axis direction) have substantially straight line configurations. Thus, in the magnetic recording head 120, the curved shape of the bit pattern (the bright portions D1 and the dark portions D2) formed in the magnetic recording medium 80 is reduced.

It is considered that such a difference is caused by the difference between the distributions of the effective magnetic fields formed by the magnetic recording heads as described below.

FIG. 9A and FIG. 9B are schematic views illustrating characteristics of the magnetic recording heads.

These figures illustrate simulation results of the distributions of the effective magnetic fields formed by the magnetic recording head 120 and the magnetic recording head 119. The shading in these figures corresponds to the strength of the magnetic field. The broken lines in the figures illustrate a magnetic field H of 12 kOe.

In the magnetic recording head 119 as shown in FIG. 9B, the broken line that illustrates the magnetic field H of 12 kOe is greatly curved at the vicinity of the magnetic pole central portion 20c. The contour lines (the magnetic field gradient) of the magnetic field are large at the vicinity of the first magnetic pole end portion 20e compared to the vicinity of the magnetic pole central portion 20c. The difference between the magnetic field gradients is large.

Conversely, in the magnetic recording head 120 as shown in FIG. 9A, the broken line that illustrates the magnetic field H of 12 kOe has substantially a straight line configuration at the vicinity of the magnetic pole central portion 20c. The contour lines (the magnetic field gradient) of the magnetic field approaches the state of the magnetic pole central portion 20c at the vicinity of the first magnetic pole end portion 20e. The difference between the magnetic field gradients is reduced.

Thus, according to the embodiment, the distribution of the effective magnetic field formed by the magnetic recording head can be controlled to be in the desired state. Thereby, the curved shape of the bit pattern (the bright portions D1 and the dark portions D2) formed in the magnetic recording medium 80 can be reduced. As a result, the BPI can be increased. Thus, according to the embodiment, a high density magnetic recording head can be provided.

An example of the effect of the width wt and the height df of the first protrusion 10p on the characteristics of the magnetic recording head 120 will now be described.

Figure 10:
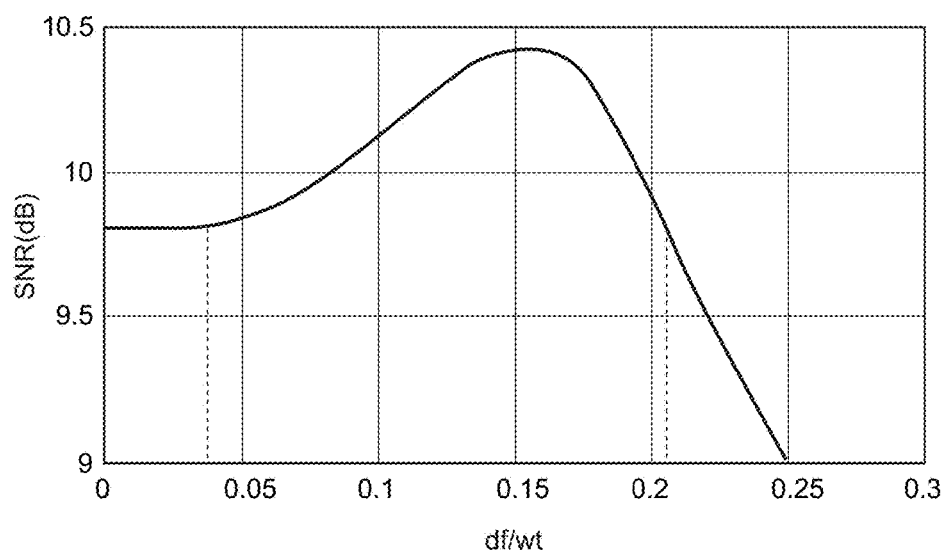
FIG. 10 is a graph of a characteristic of another magnetic recording head according to the second embodiment.

FIG. 10 is a graph of a characteristic of another magnetic recording head according to the second embodiment.

FIG. 10 illustrates simulation results of the signal-to-noise ratio when the width wt and the height df of the first protrusion 10p are changed for the magnetic recording head 120. In the example, the width wt is set to be constant; and the height df is changed. In FIG. 10, the horizontal axis is df/wt; and the vertical axis is the signal-to-noise ratio SNR (dB).

As shown in FIG. 10, the signal-to-noise ratio SNR increases when df/wt is not less than 0.05. The signal-to-noise ratio SNR increases as df/wt increases when df/wt is not less than 0.04 and not more than 0.15. The signal-to-noise ratio SNR has a downward trend as df/wt increases when df/wt exceeds 0.15. The signal-to-noise ratio SNR is low when df/wt exceeds 0.21.

For example, it is favorable for df/wt to be not less than 0.04 and not more than 0.21. df/wt is, for example, not less than 0.05 and not more than 0.2. At this time, a higher signal-to-noise ratio SNR is obtained. It is more favorable for df/wt to be not less than 0.07 and not more than 0.19. At this time, the signal-to-noise ratio SNR is about 10 dB or more. It is more favorable for df/wt to be not less than 0.1 and not more than 0.18. At this time, the signal-to-noise ratio SNR is about 10.2 dB or more.

In the example, the maximum BPI improvement ratio is about 3.5%.

In the embodiment, for example, the difference between the end portion distance de and the central portion distance dc is not more than 0.1 times the width of the magnetic pole 20 (the width wt of the second opposing surface 20a in the track width direction) (referring to FIG. 7). As recited above, it is favorable for the protrusion amount (the height df) of the shield central portion 10c to be not less than 0.05 times the width of the magnetic pole 20 (the width wt of the second opposing surface 20a in the track width direction). Thereby, the improvement effect of the curve of the effective magnetic field is realized. It is favorable for the height df to be not more than 0.15 times the width wt. A stable signal-to-noise ratio SNR is obtained. Because the curvature of the effective magnetic field is about 10% to 15%, it is considered that further modification of the magnetic pole 20 (the height df being greater than 15% of the width wt) would obstruct the flow of the flux.

Figure 11:
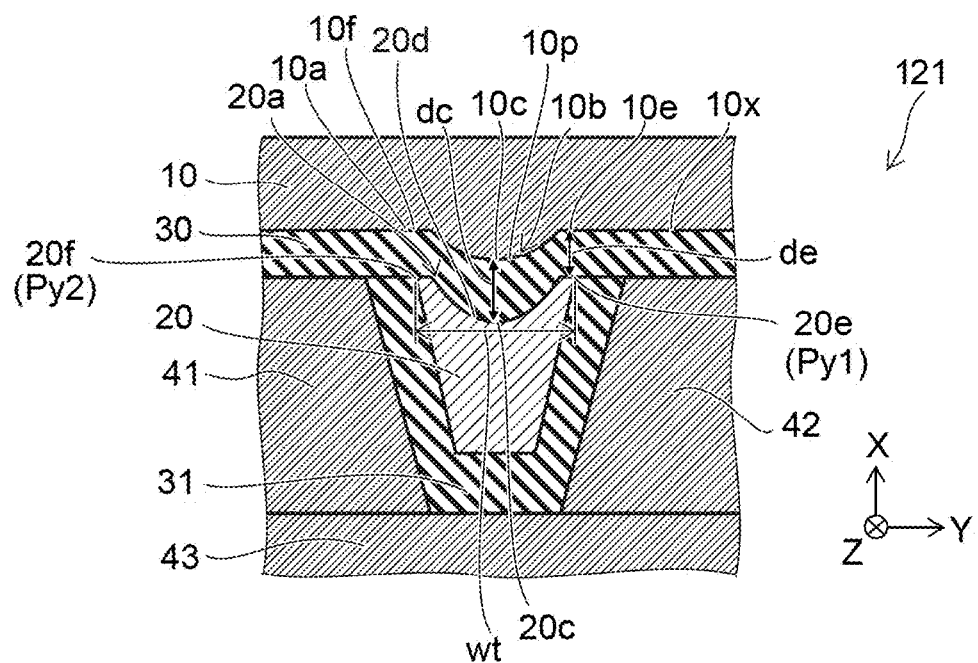
FIG. 11 is a schematic plan view showing another magnetic recording head according to the second embodiment.

FIG. 11 is a schematic plan view illustrating another magnetic recording head according to the second embodiment.

As shown in FIG. 11, the shield 10 and the magnetic pole 20 are provided in the magnetic recording head 121 according to the embodiment as well. The first opposing portion 10b includes the first protrusion 10p. The second opposing surface 20a has the recess 20d.

In the embodiment, a deep recess 20d is provided in the second opposing surface 20a. Therefore, the end portion distance de is shorter than the central portion distance dc. In other words, the gap (the trailing gap) at the end portion of the magnetic pole 20 is smaller than the gap (the trailing gap) at the central portion of the magnetic pole 20. Thereby, the magnetic field at the end portion of the magnetic pole 20 can be controlled. Thereby, the track width can be narrow. In other words, the TPI (tracks per inch) can be increased.

Third Embodiment

The embodiment relates to a magnetic recording and reproducing device. The magnetic recording and reproducing device includes one of the magnetic recording heads according to the embodiments recited above, and the magnetic recording medium 80 that has perpendicular magnetic recording to which information is recorded by the magnetic pole 20 recited above. An example of the magnetic recording and reproducing device will now be described.

Figure 12:
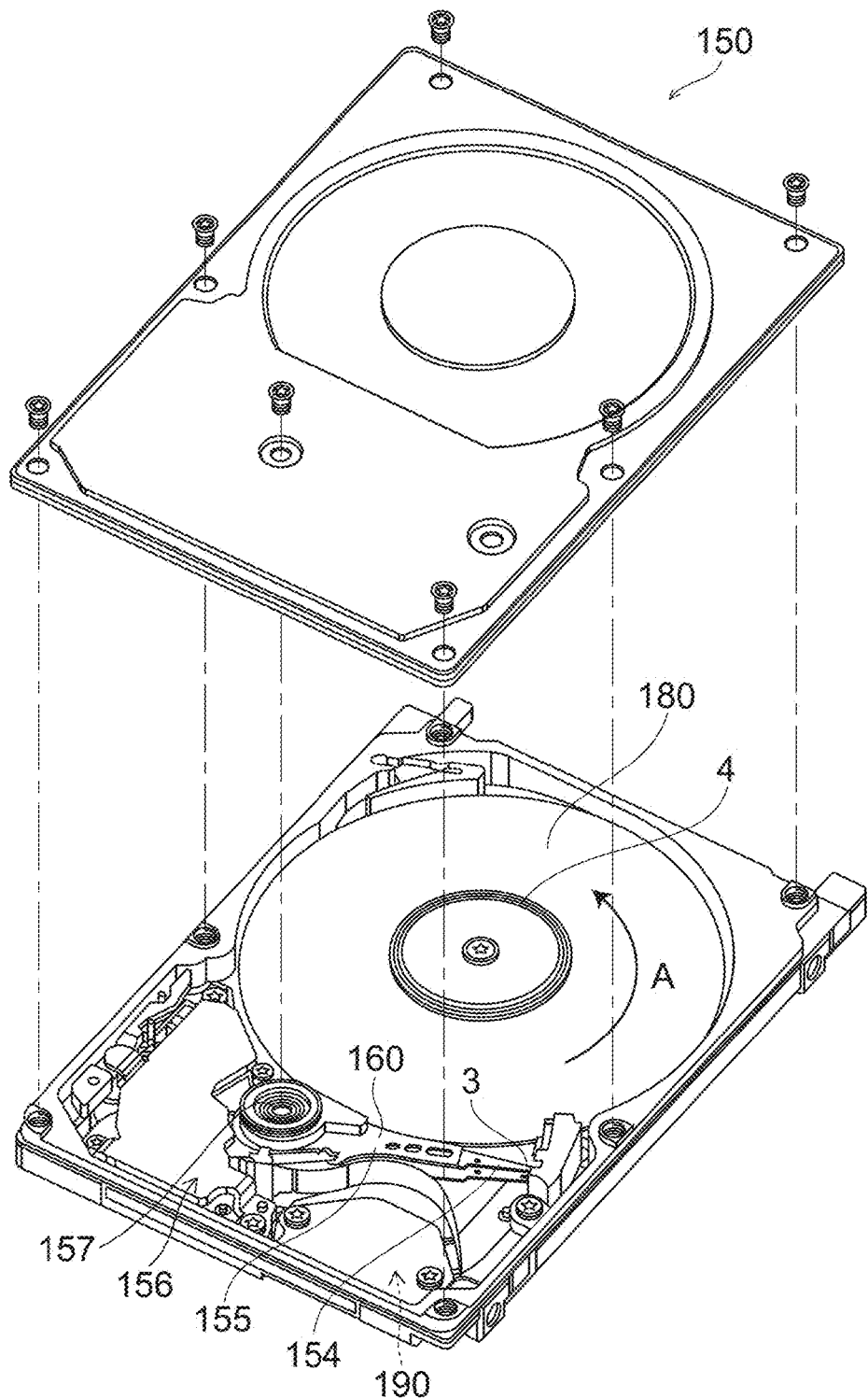
FIG. 12 is a schematic perspective view showing a magnetic recording and reproducing device according to a third embodiment.

FIG. 12 is a schematic perspective view illustrating the magnetic recording and reproducing device according to the third embodiment.

Figure 13A:
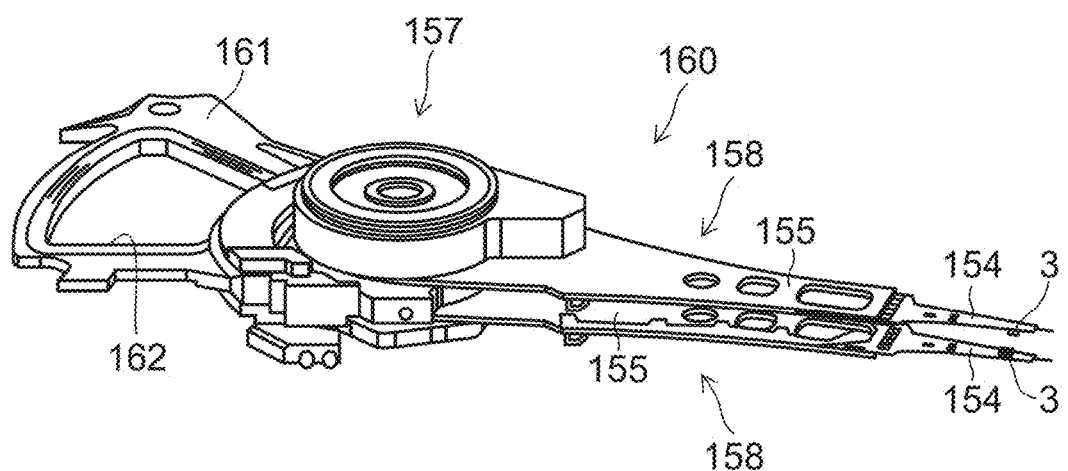
FIG. 13A and FIG. 13B are schematic perspective views showing portions of the magnetic recording and reproducing device according to the third embodiment.
Figure 13B:
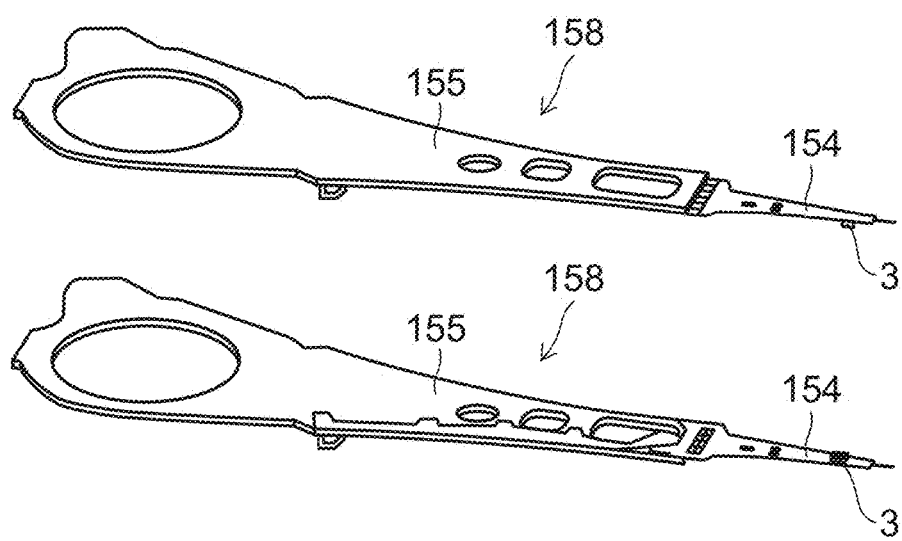

FIG. 13A and FIG. 13B are schematic perspective views illustrating portions of the magnetic recording and reproducing device according to the third embodiment.

As shown in FIG. 12, the magnetic recording and reproducing device 150 according to the embodiment is a device that uses a rotary actuator. A recording medium disk 180 is mounted to a spindle motor 4 and is rotated in the direction of arrow A by a motor that responds to a control signal from a drive device controller. The magnetic recording and reproducing device 150 according to the embodiment may include multiple recording medium disks 180. The magnetic recording and reproducing device 150 may include a recording medium 181. For example, the magnetic recording and reproducing device 150 is a hybrid HDD (Hard Disk Drive). The recording medium 181 is, for example, a SSD (Solid State Drive). The recording medium 181 includes, for example, nonvolatile memory such as flash memory, etc.

A head slider 3 that performs the recording/reproducing of the information stored in the recording medium disk 180 has a configuration such as that described above and is mounted to the tip of a suspension 154 having a thin-film configuration. Here, for example, one of the magnetic recording heads according to the embodiments described above is mounted at the tip vicinity of the head slider 3.

When the recording medium disk 180 rotates, the medium-opposing surface (the ABS) of the head slider 3 is held at a prescribed fly height from the surface of the recording medium disk 180 by the balance between the downward pressure due to the suspension 154 and the pressure generated by the medium-opposing surface of the head slider 3. A so-called "contact-sliding" head slider 3 that contacts the recording medium disk 180 may be used.

The suspension 154 is connected to one end of an actuator arm 155 that includes a bobbin unit holding a drive coil, etc. A voice coil motor 156 which is one type of linear motor is provided at one other end of the actuator arm 155. The voice coil motor 156 may include a drive coil that is wound onto the bobbin unit of the actuator arm 155, and a magnetic circuit made of a permanent magnet and an opposing yoke that are disposed to oppose each other with the coil interposed. The suspension 154 has one end and one other end; the magnetic recording head is mounted to the one end of the suspension 154; and the actuator arm 155 is connected to the one other end of the suspension 154.

The actuator arm 155 is held by ball bearings provided at two locations on and under a bearing unit 157; and the actuator arm 155 can be caused to rotate and slide unrestrictedly by the voice coil motor 156. As a result, the magnetic recording head is movable to any position of the recording medium disk 180.

FIG. 13A illustrates the configuration of a portion of the magnetic recording and reproducing device and is an enlarged perspective view of a head stack assembly 160.

FIG. 13B is a perspective view illustrating a magnetic recording head assembly (a head gimbal assembly (HGA)) 158 which is a portion of the head stack assembly 160.

As shown in FIG. 13A, the head stack assembly 160 includes the bearing unit 157, the head gimbal assembly 158 that extends from the bearing unit 157, and a support frame 161 that extends from the bearing unit 157 in the opposite direction of the HGA and supports a coil 162 of the voice coil motor.

As shown in FIG. 13B, the head gimbal assembly 158 includes the actuator arm 155 that extends from the bearing unit 157, and the suspension 154 that extends from the actuator arm 155.

The head slider 3 is mounted to the tip of the suspension 154. One of the magnetic recording heads according to the embodiments is mounted to the head slider 3.

In other words, the magnetic head assembly (the head gimbal assembly) 158 according to the embodiment includes the magnetic recording head according to the embodiment, the head slider 3 to which the magnetic recording head is mounted, the suspension 154 that has the head slider 3 mounted to the one end, and the actuator arm 155 that is connected to the one other end of the suspension 154.

The suspension 154 includes, for example, lead wires (not shown) that are for writing and reproducing signals, for a heater that adjusts the fly height, for a spin torque oscillator, etc. The lead wires are electrically connected to electrodes of the magnetic recording head embedded in the head slider 3.

A signal processor 190 is provided to write and reproduce the signals to and from the magnetic recording medium by using the magnetic recording head. For example, the signal processor 190 is provided on the backside of the drawing of the magnetic recording and reproducing device 150 shown in FIG. 12. The input/output lines of the signal processor 190 are electrically connected to the magnetic recording head by being connected to electrode pads of the head gimbal assembly 158.

Thus, the magnetic recording and reproducing device 150 according to the embodiment includes a magnetic recording medium, the magnetic recording head according to the embodiment recited above, a movable unit that is relatively movable in a state in which the magnetic recording medium and the magnetic recording head are separated from each other or in contact with each other, a position controller that aligns the magnetic recording head at a prescribed recording position of the magnetic recording medium, and a signal processor that writes and reproduces signals to and from the magnetic recording medium by using the magnetic recording head.

In other words, the recording medium disk 180 is used as the magnetic recording medium recited above.

The movable unit recited above may include the head slider 3.

The position controller recited above may include the head gimbal assembly 158.

Thus, the magnetic recording and reproducing device 150 according to the embodiment includes a magnetic recording medium, the magnetic head assembly according to the embodiment, and a signal processor that writes and reproduces signals to and from the magnetic recording medium by using a magnetic recording head mounted to the magnetic head assembly.

The embodiments comprises following features.

Feature 1. A magnetic recording head, comprising:
a magnetic pole; and
a shield having a first opposing surface opposing the magnetic pole,
the magnetic pole having a second opposing surface opposing the shied,
the magnetic pole includes
a first magnetic pole end portion, and
a second magnetic pole end portion arranged with the first magnetic pole end portion in a track width direction of the magnetic pole,
the first opposing surface including
a first shield end portion overlapping the first magnetic pole end portion in a first direction from the magnetic pole toward the shield,
a second shield end portion overlapping the second magnetic pole end portion in the first direction,
a shield central portion, a position of the shield central portion in the track width direction is located between a position of the first shield end portion in the track width direction and a position of the second shield end portion in the track width direction,
a third distance between a linear line and the shield central portion in the first direction being shorter than a first distance between the linear line and the first shield end portion in the first direction and shorter than a second distance between the linear line and the second shield end portion in the first direction, the linear line connecting the first magnetic pole end portion and the second magnetic pole end portion.

Feature 2. The head according to Feature 1, wherein
the second opposing surface includes a magnetic pole central portion, a position the magnetic pole central portion in track width direction is located between a position of the first magnetic pole end portion in the track width direction and a position of the second magnetic pole end portion in the track width direction,
a central portion distance between the magnetic pole central portion and the shield central portion is shorter than the first distance.

Feature 3. The head according to Feature 2, wherein the first distance is not less than 1.1 times and not more than 1.5 times the central portion distance.

Feature 4. The head according to Feature 2, wherein the second opposing surface includes a protrusion.

Feature 5. The head according to Feature 2, wherein the second opposing surface is a plane.

Feature 6. The head according to Feature 1, wherein the second opposing surface has a recess.

Feature 7. The head according to Feature 6, wherein
the first opposing surface includes a first opposing portion overlapping the magnetic pole in the first direction, and
a configuration of the recess of the second opposing surface is made along a configuration of the first protrusion of the first opposing portion.

Feature 8. The head according to Feature 6, wherein
the second opposing surface includes a magnetic pole central portion, a position the magnetic pole central portion in track width direction is located between a position of the first magnetic pole end portion in the track width direction and a position of the second magnetic pole end portion in the track width direction,
a central portion distance between the magnetic pole central portion and the shield central portion is substantially same as the first distance.

Feature 9. The head according to Feature 6, wherein
the second opposing surface includes a magnetic pole central portion, a position the magnetic pole central portion in track width direction is located between a position of the first magnetic pole end portion in the track width direction and a position of the second magnetic pole end portion in the track width direction,
a difference between a central portion distance between and a first distance is not more than 0.1 times a width in the track width direction of the second opposing surface, the central portion distance being a distance between the magnetic pole central portion and the shield central portion.

Feature 10. The head according to Feature 2, wherein
the first opposing surface further includes a non-opposing portion, the magnetic pole and the non-opposing portion not overlapping in the first direction, and
a distance along the first direction between a position in the first direction of the non-opposing portion and a position in the first direction of the shield central portion is not less than 0.04 times and not more than 0.21 times a width in the track width direction of the second opposing surface.

Feature 11. The head according to Feature 1, wherein
the first opposing surface further includes a non-opposing portion, the magnetic pole and the non-opposing portion not overlapping in the first direction, and
the non-opposing portion is a plane.

Feature 12. The head according to Feature 1, wherein the magnetic pole includes:
a first portion; and
a second portion provided between the first portion and the shield, and
a width in the track width direction of the second portion is wider than a width in the track width direction of the first portion.

Feature 13. The head according to Feature 1, wherein
the first opposing surface includes a first opposing portion overlapping the magnetic pole in the first direction, and
the first opposing portion has a curved configuration.

Feature 14. The head according to Feature 1, wherein
the first opposing surface includes a first opposing portion overlapping the magnetic pole in the first direction, and
the first opposing portion has a step configuration.

Feature 15. The head according to Feature 1, wherein the shield is a trailing shield.

Feature 16. A magnetic recording and reproducing device, comprising:
  a magnetic recording head; and
  a magnetic recording medium having perpendicular magnetic recording, information being recorded in the magnetic recording medium by the magnetic pole,
  the magnetic recording head including:
  a magnetic pole; and
  a shield having a first opposing surface opposing the magnetic pole,
  the magnetic pole having a second opposing surface opposing the shied,
  the magnetic pole includes
    a first magnetic pole end portion, and
    a second magnetic pole end portion arranged with the first magnetic pole end portion in a track width direction of the magnetic pole,
  the first opposing surface including
    a first shield end portion overlapping the first magnetic pole end portion in a first direction from the magnetic pole toward the shield,
    a second shield end portion overlapping the second magnetic pole end portion in the first direction,
    a shield central portion, a position of the shield central portion in the track width direction is located between a position of the first shield end portion in the track width direction and a position of the second shield end portion in the track width direction,
  a third distance between a linear line and the shield central portion in the first direction being shorter than a first distance between the linear line and the first shield end portion in the first direction and shorter than a second distance between the linear line and the second shield end portion in the first direction, the linear line connecting the first magnetic pole end portion and the second magnetic pole end portion.

Feature 17. The device according to Feature 16, wherein a designated portion of the magnetic recording medium opposes the shield after opposing the magnetic pole.

According to the embodiments, a high density magnetic recording head and magnetic recording and reproducing device are provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording heads such as shields, magnetic poles and side shields, and included in magnetic recording and reproducing device such as magnetic recording mediums, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording heads and magnetic recording and reproducing devices practicable by an appropriate design modification by one skilled in the art based on the magnetic recording heads and the magnetic recording and reproducing devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording head, comprising:
  a magnetic pole; and
  a shield having a first opposing surface opposing the magnetic pole,
  the magnetic pole having a second opposing surface opposing the shield,
  the first opposing surface including a first opposing portion, the magnetic pole and the first opposing portion overlapping in a first direction from the magnetic pole toward the shield,
  the first opposing portion including a first protrusion,
  the second opposing surface including:
    a magnetic pole end portion in a track width direction; and
    a magnetic pole central portion separated from the magnetic pole end portion in the track width direction; and a recess,
  the first opposing portion including:
    a shield end portion, the magnetic pole end portion and the shield end portion overlapping in the first direction; and
    a shield central portion, the magnetic pole central portion and the shield central portion overlapping in the first direction, and
  a central portion distance between the magnetic pole central portion and the shield central portion being shorter than an end portion distance between the magnetic pole end portion and the shield end portion.

2. The head according to claim 1, wherein the end portion distance is not less than 1.1 times and not more than 1.5 times the central portion distance.

3. The head according to claim 1, wherein the recess of the second opposing surface is made along the first protrusion of the first opposing portion.

4. The head according to claim 1, wherein
  the first opposing surface further includes a non-opposing portion, the magnetic pole and the non-opposing portion not overlapping in the first direction, and
  a distance along the first direction between a position in the first direction of the non-opposing portion and a position in the first direction of the first protrusion is not less than 0.04 times and not more than 0.21 times a width in the track width direction of the second opposing surface.

5. The head according to claim 1, wherein
the first opposing surface further includes a non-opposing portion, the magnetic pole and the non-opposing portion not overlapping in the first direction, and
the non-opposing portion is a plane.

6. The head according to claim 1, wherein
the magnetic pole includes:
  a first portion; and
  a second portion provided between the first portion and the shield, and
a width in a track width direction of the second portion is wider than a width in the track width direction of the first portion.

7. The head according to claim 1, wherein the first opposing portion has a curved configuration.

8. The head according to claim 1, wherein the first opposing portion has a step configuration.

9. The head according to claim 1, wherein the shield is a trailing shield.

10. A magnetic recording and reproducing device, comprising:
a magnetic recording head; and
a magnetic recording medium having perpendicular magnetic recording, information being recorded in the magnetic recording medium by a magnetic pole,
the magnetic recording head including:
  the magnetic pole; and
  a shield having a first opposing surface opposing the magnetic pole,
  the magnetic pole having a second opposing surface opposing the shield,
  the first opposing surface including a first opposing portion, the magnetic pole and the first opposing portion overlapping in a first direction from the magnetic pole toward the shield,
the first opposing portion including a first protrusion,
the second opposing surface including:
  a magnetic pole end portion in a track width direction;
  a magnetic pole central portion separated from the magnetic pole end portion in the track width direction; and a recess,
the first opposing portion including:
  a shield end portion, the magnetic pole end portion and the shield end portion overlapping in the first direction; and
  a shield central portion, the magnetic pole central portion and the shield central portion overlapping in the first direction, and
a central portion distance between the magnetic pole central portion and the shield central portion being shorter than an end portion distance between the magnetic pole end portion and the shield end portion.

11. The device according to claim 10, wherein a portion of the magnetic recording medium opposes the shield after opposing the magnetic pole.

12. The device according to claim 10, wherein the end portion distance is not less than 1.1 times and not more than 1.5 times the central portion distance.

* * * * *